Figure 1:
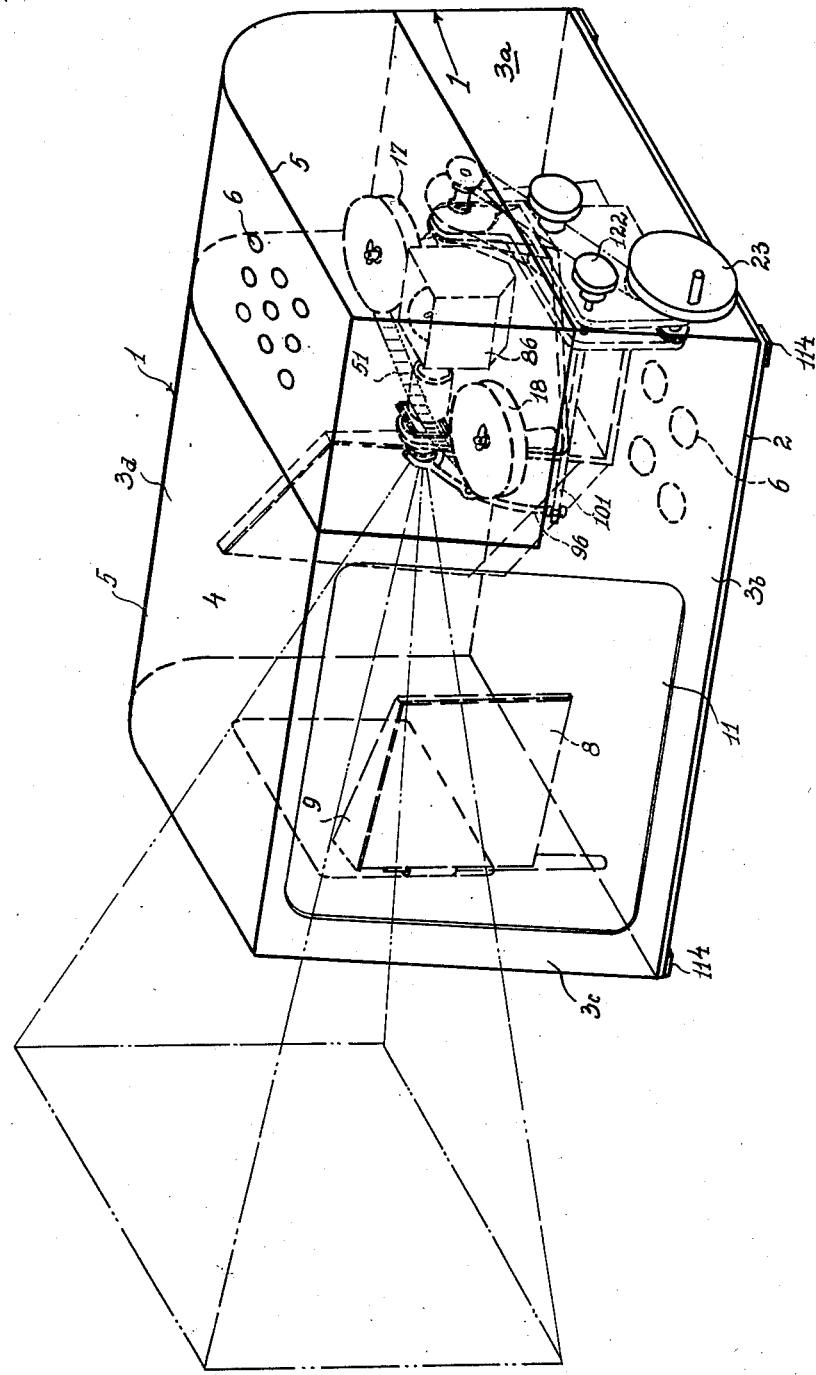

June 21, 1949. N. S. STERN 2,473,736
MICROFILM READER AND PROJECTING APPARATUS
Filed May 22, 1946 6 Sheets-Sheet 1

INVENTOR.
NATHAN SALLY STERN
BY
ATTORNEY

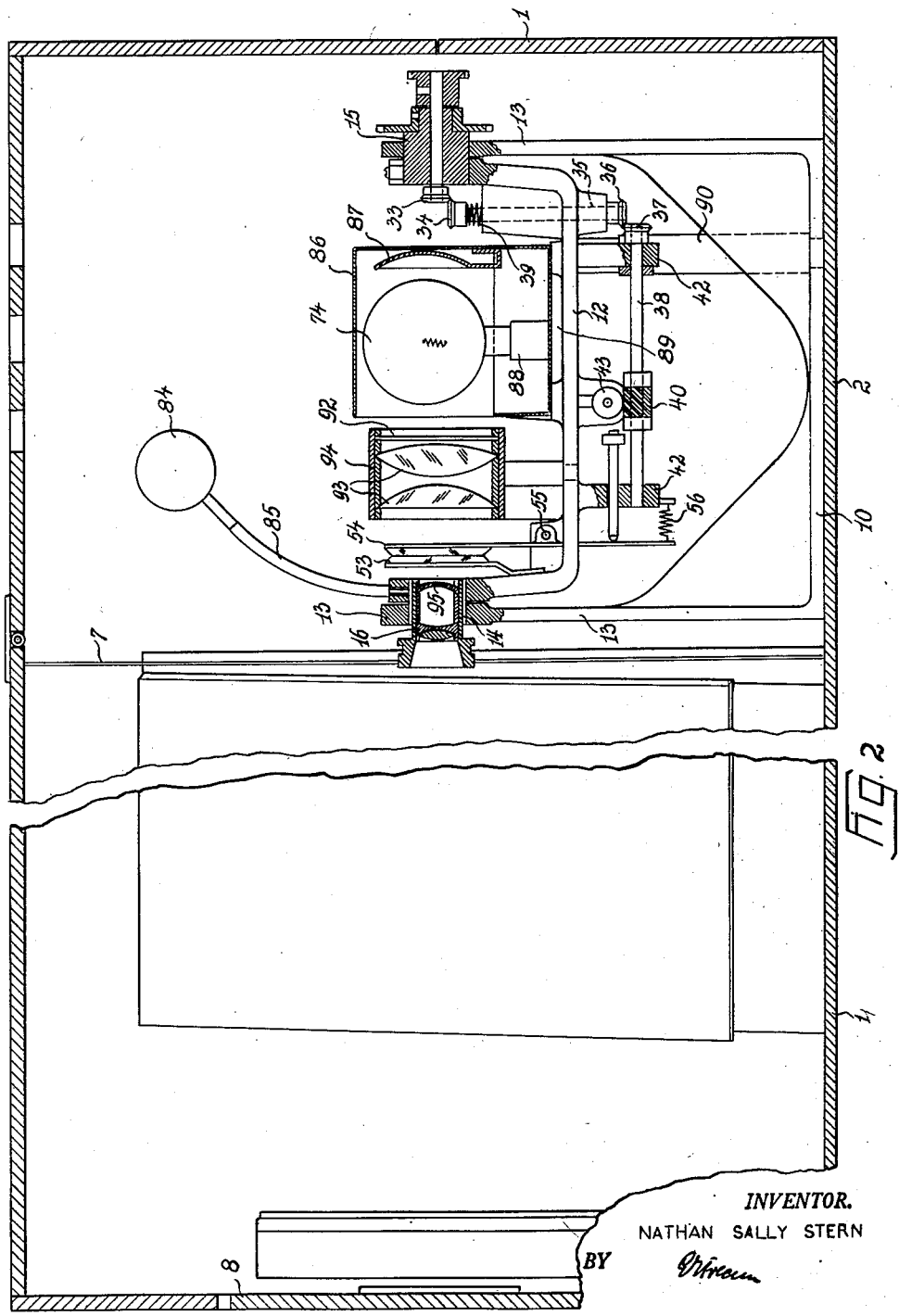

June 21, 1949.    N. S. STERN    2,473,736
MICROFILM READER AND PROJECTING APPARATUS
Filed May 22, 1946    6 Sheets-Sheet 3
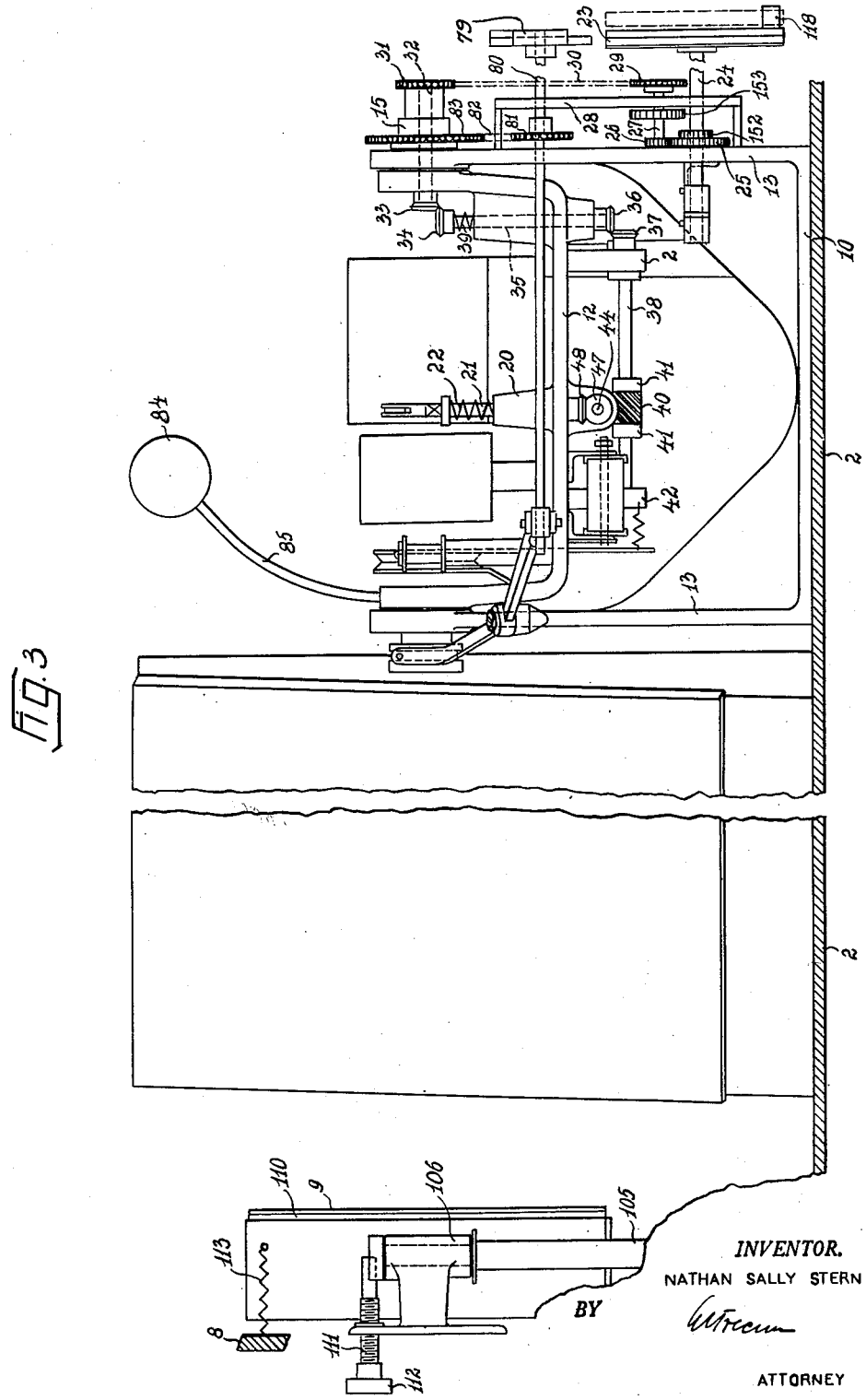
INVENTOR.
NATHAN SALLY STERN
BY
ATTORNEY June 21, 1949.  N. S. STERN  2,473,736
MICROFILM READER AND PROJECTING APPARATUS
Filed May 22, 1946  6 Sheets-Sheet 4
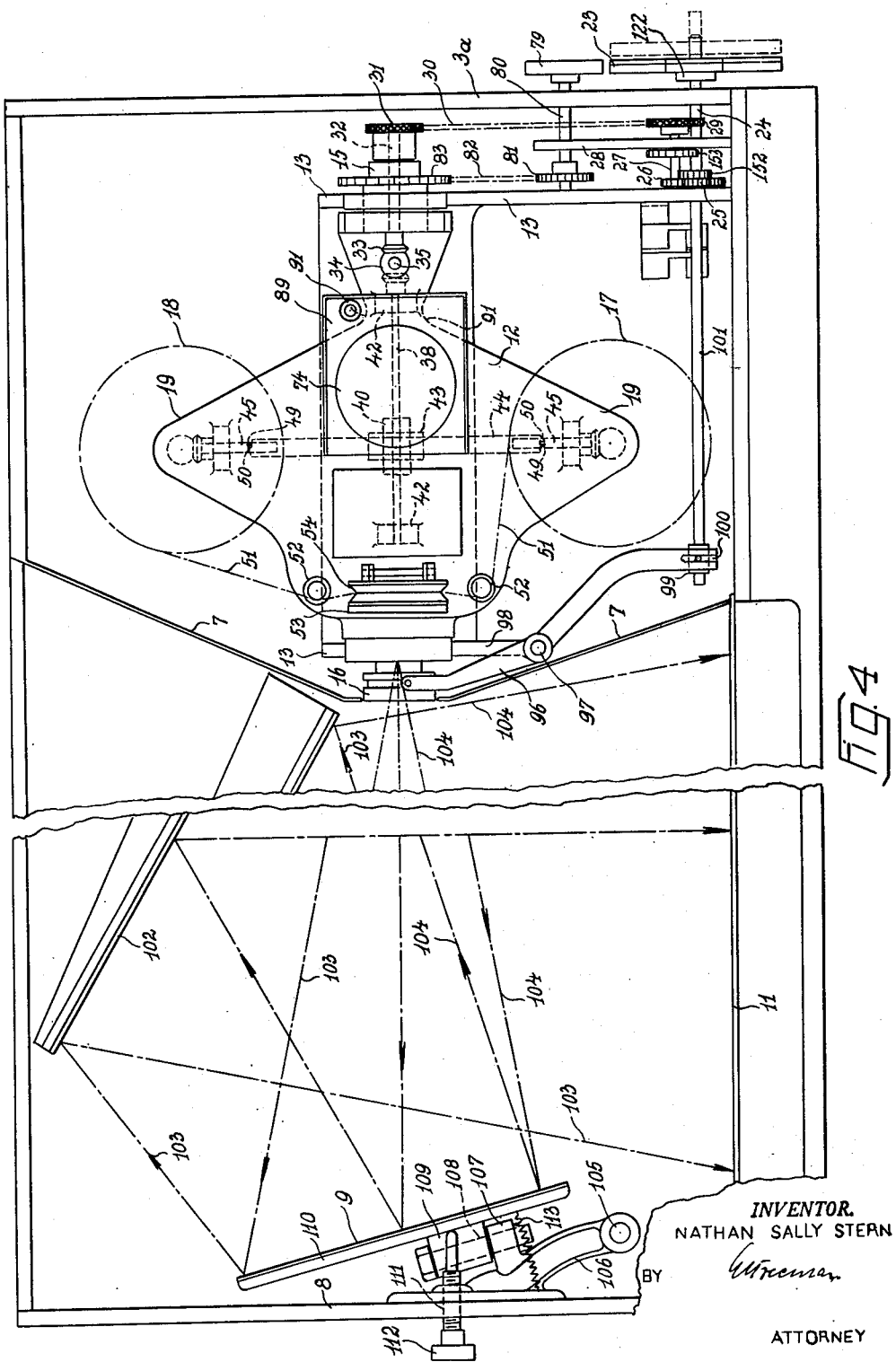
INVENTOR.
NATHAN SALLY STERN
BY
ATTORNEY June 21, 1949.   N. S. STERN   2,473,736
MICROFILM READER AND PROJECTING APPARATUS
Filed May 22, 1946   6 Sheets-Sheet 5
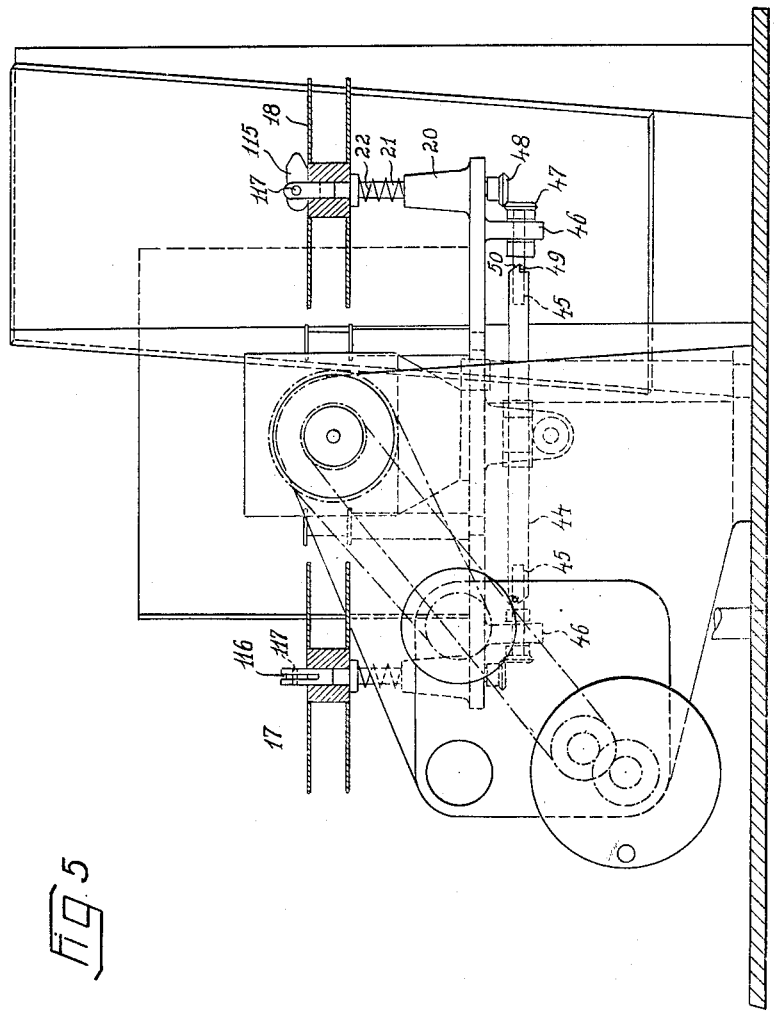
INVENTOR.
NATHAN SALLY STERN
BY
ATTORNEY

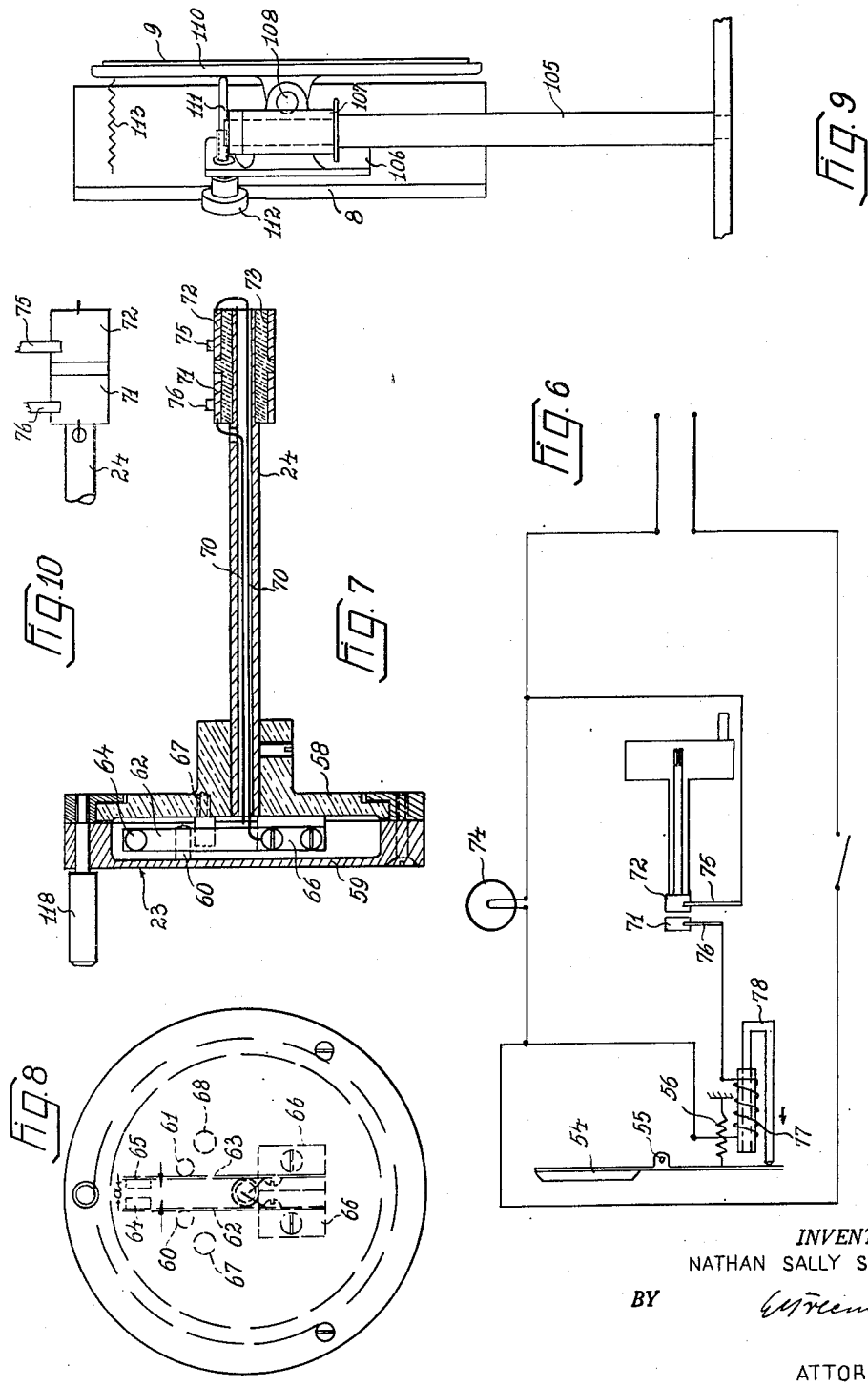

Patented June 21, 1949

2,473,736

UNITED STATES PATENT OFFICE 2,473,736

MICROFILM READER AND PROJECTING APPARATUS

Nathan Sally Stern, New York, N. Y.

Application May 22, 1946, Serial No. 671,625

16 Claims. (Cl. 88—24)

The invention relates to microfilm readers and projectors adapted to produce enlarged film images and to project these images as well as any other type of opaque or colored pictures on screens and other suitable observation faces.

It is the primary object of the invention to provide a machine of the above stated type which in spite of a high degree of magnification requires a relatively small operating and mounting space and which can be operated without a change of the observation post, as all control means are located within easy reach of the operator.

It is another important object of the invention to enable the operator of the machine to view the film images at daylight as well as at any other illuminating conditions.

It is another object of the invention to provide a mechanism which will permit a displacement of the film image on the screen or on any other observation surface in any desired direction and therefore make it possible to make enlarged views of specific desired sections of the image carried by the film.

It is also an object of the invention to arrest the film in a desired viewing position.

A further important object of the invention resides therein that all operating elements of the machine are enclosed by a casing and not visible from outside.

It is a further object of the invention to assemble the major portion of the film holding, transporting and projecting parts including its operating elements to a unit which is rotatable about the horizontal axis while the light source is stationary in order to avoid loss of light.

It is an object of the invention to secure equal projecting conditions in any position of the rotatable film holding, transporting and projecting unit.

It is also an object of the invention to provide a plurality of projection surfaces and to render the magnified film image visible on a screen attached to the machine or another observation surface located outside of the machine.

It is another object of the invention to provide means for an exact forming of the film image on the observation surface. It is an important object of the invention to open the film gate upon a slight movement of a handwheel which controls the film transporting mechanism thus avoiding the great disadvantages caused by the inertia of the customary mechanically operated film transporting devices at the same time excluding outside damage and scratching of the film.

Another object of the invention is to provide all control means for the operation of the film holding, transporting, winding and projecting unit on the outside of the machine casing.

It is also an important object of the invention to provide the means for the direction of the magnified film image onto the observation surface with a three times motion whereby the film image or a part thereof can be adjusted on the observation surface without displacing the film holding transporting and projecting unit, which means a reduction in moving force and in the wear of the operating elements, thus greatly improving the accuracy of the projection.

It is a further object of the invention to provide means for a variation of the film transporting speed.

It is also an object of the invention to provide means for a location of the entire film holding, transporting and projecting unit on a single support situated within the machine casing.

Additional objects and advantages of the invention will become apparent as this specification proceeds.

A preferred embodiment of the same is illustrated by way of example in the accompanying drawings, of which Fig. 1 is a diagrammatic perspective view showing the arrangement of some essential parts of the machine within a casing, Fig. 2 is a vertical section taken through the center plane or the optical axis of the machine, the latter being shown partly in a front elevation and partly in section, Fig. 3 is a partly broken front elevation of the machine mounted on the base plate of the casing, Fig. 4 is a top view of the machine, the top of the casing being removed, Fig. 5 is a side elevation of the same mounted on the base plate of the casing, Fig. 6 is a diagram of the electrical circuit controlling the operation of a solenoid for the displacement of the one film gate plate, Fig. 7 is an axial sectional view of the handwheel controlling the film transporting means and the operation of the movable film gate plate, Fig. 8 is a front elevation of the handwheel shown in Fig. 7.

Fig. 9 is a side elevation of the mechanism for operating one of the reflecting mirrors, and Fig. 10 is a detail showing the arrangement of the contact brushes connecting the handwheel with an electric circuit.

Referring now in detail to the figures, numeral 1 denominates a casing which is composed of four side walls 3a, 3b, 3c, 3d and a top 4, the casing is supported on a base 2.

The casing accommodates the entire machine and none of its operative parts is visible from the outside.

In order to inspect the machine mechanism, to replace the light source, to clean the lenses and to change the film and so forth, a cover 5 is provided which is composed of a part of the top 4 and of the side walls 3a, 3b and 3d, and is preferably hingedly connected with top 5. By lifting the cover the machine mechanism is rendered visible for inspection and accessible to any desired manipulation.

A screen 11 is located in wall 3b, which forms the front wall of the housing. Ventilating apertures 6 are provided in base plate 2 and in top 4 to cool the light source. Base 2 rests on rubber feet 114 whereby vibration and reading disturbances are eliminated.

In the embodiment of the invention which by way of example is shown in the drawings, a partition 7, see Figs. 2, 3, is provided which divides casing 1 into a right side and a left side compartment.

The right side compartment accommodates the film holding, film transporting and film projecting unit and the left side compartment two mirrors which direct and deflect the film image onto an observation surface; this observation surface will in most cases be screen 11; but means are provided to also show the film image outside of the housing. The provision of this type means is not new per se; however, this problem is solved in the case of the instant invention in a particularly effective manner.

For this purpose a side wall 3c is provided with a door 8 and this door is provided with a mirror 9. By opening door 8 mirror 9 is moved out of the path of the film image projection indicated by dash-dotted lines in Fig. 1; accordingly the film image may be projected through the door opening onto any observation surface such as a wall situated outside of casing 1.

The film holding, film transporting and film projecting unit essentially consists of a light source, film holding and transporting reels, a light condensing device, a film gate, a lens aggregate and means to operate this unit. This entire unit is supported inside of housing 1 on base 2.

For this purpose an outer U-shaped frame is mounted with its web portion 10 on base 2. A second inner U-shaped frame 12 is rotatably carried in bearings located in the upper end portion of the two flanges 13 of the outer frame.

Frame 12 is provided with an inner bushing 14 and an outer bushing 15 which are rotatably located in the upper end portion of flanges 13. Bushing 14 accommodates the projecting lenses 95; these lenses are housed in a barrel 16 and this barrel is for focusing purposes axially slidably located in bushing 14. The means for the axial displacement of the lens barrel 16 are described in a later part of this specification.

The film holding and transporting means comprise two reels 17, 18, Fig. 4, 5; the reels are located on the inner rotatable frame 12 which for this purpose is provided with two lateral extensions 19 forming a turntable with the frame; hubs 20 are located on extensions 19 of the turntable.

Shafts 21 extend through hubs 20 and springs 22 surrounding shafts 21 are located between the upper end of the hubs and the reels 17, 18 to keep the reels in cooperative contact with retaining elements 115 and thereby in their proper working position. These retaining elements are more clearly shown in Fig. 5; for clarity's sake only the one of the shafts 21 is shown provided with retaining elements 115.

The upper ends of shafts 21 are provided with slots 116 and pins 117 mounted in the end portions of the shafts project through slots 116. The retaining elements have the shape of a two arm lever, the one arm being shorter than the other arm and being rounded at the end; this lever is rotatably mounted on pin 117.

By rotating retaining element 115 about this pin the rounded arm will enter into slot 116 whereas the longer arm extends in the direction of the shaft thereby rendering it possible to lift the reel 17 or 18 from shafts 21.

To lock the reels on the shafts 21, retaining element 115 is turned so as to rest on the upper face of the reels which are secured there by the cooperation of spring 22 and retaining element 115 in their working position. The reel holding shafts 21 are operated by a train of gears and other transmission elements which are controlled by handwheel 23 located outside of casing 1, Figs. 2, 3. This handwheel is mounted on shaft 24 which enters into casing 1 through sidewall 3a and is supported in flange 13 and bracket 28 attached to this flange.

Shaft 24 carries at its inner end gear wheel 25; this gear meshes with gear 26 located on shaft 27; this shaft is also mounted in flange 13 and bracket 28. Shaft 27 carries at its outer end a sprocket wheel 29. The rotation of wheel 29 is transmitted by chain 30 to sprocket wheel 31 which is mounted on shaft 32 located in bushing 15. This shaft carries at its inner end bevel gear 33. Bevel gear 33 cooperates with bevel gear 34 mounted on shaft 35. Shaft 35 which is held in a hub of the inner frame 12 carries on its opposite lower end a bevel gear 36, the latter coacting with bevel gear 37 mounted on shaft 38. Shaft 35 is kept in position by spring 39. Shaft 38 carries worm gear 40 held in position by collars 41. The shaft is supported in two bearings 42 attached to rotatable frame 12; worm gear 40 cooperates with worm gear 43, Fig. 2, 4 located on shaft 44. This shaft is hollow; two shafts 45 extend into its two hollow end portions; these shafts are carried by bearings located in supports 46, Fig. 5; bevel gears 47 are mounted on the outer ends of shafts 45, which gears mesh with bevel gears 48 mounted on the lower end of reel shafts 21; by the thus described elements the rotation of hand wheel 23 is transmitted to the reels 17, 18; the operation of these reel operating elements is controlled by the hand wheel 23.

Hollow shaft 44 is at both ends provided with a pin 49; shafts 45 carried in hollow shaft 44 are provided with one or more teeth 50 within the reach of pins 49. Each pin 50 may be actuated by its tooth 45 of shaft 44 only upon rotation of this shaft in one direction. Therefore, if shaft 44 is rotated in one sense, one pin 50 will be entrained by the contact with its corresponding tooth 49, entraining one shaft 45; by the rotation of shaft 44 in the opposite direction, the other shaft 45 will be rotated. Thus by rotation of the handwheel 23 in one or the other sense film 51, see Fig. 4, will be wound upon or unwound from the reels 17, 18.

In order to change the transport speed of the film a gear change device is provided which is manipulated by axial displacement of handwheel 23; the two operating positions of the handwheel 23 are shown in Figs. 3 and 4 in full and in dotted lines.

If it is intended to transport the film with a reduced speed handwheel 23 is shifted into the dotted line position entraining thereby shaft 24; in this manner the cooperation of gears 25, 26 is interrupted by the displacement of the shaft and coaction is established between gears 152 and 153, see Figs. 3 and 4, the latter gear driving shaft 27 and sprocket wheel 29 with a reduced speed.

The rotation of wheel 29 is, as previously described, transmitted by chain 30 to sprocket wheel 31, from there to shaft 32, shaft 38 and to the reel shafts 21. The film 51 may, therefore, be passed from one to the other reel with a different speed; this is achieved by the displacement of handwheel 23 in its two operating positions.

As apparent from Fig. 4, the film 51 is guided on its way from one to the other reel by rollers 52; it is conducted through the film gate which consists of two transparent plates 53, 54. Plate 53 is fixedly mounted on frame 12 and plate 54 is rotatable about pivot 55, also attached to this frame, Fig. 2. The film gate 53, 54 is kept in its closed position by a spring 56; by the thus exerted pressure the film is straightened and flattened.

If the film is to be passed from one to the other reel glass plate 54 is rotated about pivot 55 against the pressure of the spring, thereby separated from plate 53 and a gap is created between the plates permitting the free passage of the film.

The means to accomplish the opening of the film gate are shown in detail in Figs. 7 and 8.

Handwheel 23 is composed of two discs, viz. an outer disc 59 and an inner disc 58 which are connected leaving a cavity therebetween. The inner disc 58 is connected with shaft 24, which is hollow. Outer disc 59 carries two small pins 60 and 61 which project into the cavity of the handwheel towards disc 58. Two contact blades 62, 63 are attached to disc 58 by angle pieces 66 made of an electrically insulating material; these contact blades carry the contact pins 64, 65, which are fixed at a distance a from each other, when the gate is closed.

Disc 58 carries two pins 67, 68 which protrude into the cavity of the handwheel 23 towards disc 59. Contact blades 62, 63 are connected to wires 70 leading through shaft 24 to slip rings 71, 72 located on the insulated bushing 73 attached to shaft 24.

Contact brushes 64, 65 are connected with the lamp circuit; the diagram illustrating this connection is shown in Fig. 6. The lamp current is connected to contact brush 75 and slip ring 72 on the one side and to a solenoid coil 77 and contact brush 76 and slip ring 71 on the other side; the solenoid coil surrounds the axially displaceable core 78.

The operation of this gate opening and closing device is described in a later part of this specification.

In order to project the film in any other than the upright position frame 12 is made rotatable; the rotation of the frame is effected by knob 79, Fig. 4; the rotation of the knob is transmitted to shaft 80 and from there to sprocket wheel 81, by chain 82 to sprocket 83 which is located on bushing 15, connected with frame or turntable 12. The rotation of this turntable is facilitated and counterbalanced by counterweight 84, which by means of a handle 85 is connected with frame 12. Accordingly this frame can also be rotated by handle 85 from the inside of casing 1.

It is an important feature of this invention that the entire mechanism for the transport of the film in the one or in the other direction and for the opening and closing of the film gate is so arranged that these mechanisms are fully operative in all positions of turntable 12 while maintaining at the same time equal film projecting conditions.

An essential part of the instant microfilm reader is its optical system.

This system comprises a preferably electrical light source or lamp 74 which is carried on a socket 88, Fig. 2; this socket is situated in the center line of the projection system and located on a support 89 which is carried on a post 90, Fig. 2; this post is positioned on the outer stationary frame in eccentrical relation to the center line of the projecting system in order to avoid interference with the rotation of turntable 12; for the same purpose this turntable is provided with cut-outs 91; support 89 also carries the lamp housing 86 which in addition to lamp 74 encases the reflector 87.

The light beam reflected by this reflector passes into a condenser aggregate also mounted on turntable 12; this condenser aggregate, Fig. 2, consists of a heat filter 92 and two condenser lenses 93, which are encased in barrel 94 positioned on turntable 12.

A further part of the projecting system are the projecting lenses 95 which are housed in barrel 16; the latter is axially slidable in bushing 14 fixed to the turntable or inner frame 12, as mentioned before; therefore, also the lens aggregate is rotated together with frame 12.

Means shown in detail in Fig. 4 are provided to axially displace the lenses 95 for focusing purposes. A two arm lever 96 is rotatably mounted on pivot 97 which is carried in support 98 fixed to the outer stationary frame 10, 13. The one arm of lever 96 is forked-shaped to glide in a groove at barrel 16, and the other arm is provided with a bushing 99 vertically slidably located along slot 100 provided in the end of the lever arm; sleeve 99 has an inside thread and a rod 101 provided with a corresponding thread fits for coaction into the sleeve 99; rod 101 extends through side wall 3a of the housing and its outside end carries a knob 122.

The turning of knob 122 causes lever 96 to swing forward and backward about pivot 97, thereby axially displacing the lens barrel 16 in opposite directions.

The passage of the light beam is shown in Fig. 4, the border rays being indicated by dash-dotted lines 103, 104.

In adjacent relationship with the above described film holding, transporting and projecting unit the means which direct the light beam onto an observation surface are located in housing 1.

If the housing is divided into two compartments by a partition 7 these beam directing means are located in the left side compartment, see Fig. 4. They comprise in the illustrated embodiment of the invention two mirrors, viz., a side mirror 9 and a rear mirror 102.

The function of side mirror 9 is of particular importance. This mirror is mounted in such a manner that it may be turned about a vertical and a horizontal axis in order to displace the film image projected onto the screen 11 in a horizontal and in a vertical direction.

Moreover the mirror is, as stated above, attached to door 8 and, therefore, can be turned completely out of the path of the light rays, whereupon a highly magnified film image may be projected out of the housing and on any convenient observation surface, for instance a wall.

If the film image is projected onto the screen 11, the light beam emitted from lamp 74 after having passed the condensing device 92—94, is projected by the lenses 95 and follows the path indicated by dash-dotted lines 103, 104 until it hits mirror 9; from there it is reflected onto the rear mirror 102 and then onto screen 11.

The following means are provided to operate mirror 9 in the above indicated manner.

A pivot 105 is fixed on the base plate 2. This pivot carries at its upper end a bracket 106 which is attached to door 8; however, it is understood that the particular construction of mirror 9 is not dependent upon door 8 and that the mirror may accomplish its particular functions without a door, in which case suitable means will be provided to rotate the same about pivot 105.

Bracket 106 is provided with an ear 107 which accommodates pivot pin 108 supporting a bearing 109 attached to plate 110 which carries mirror 9. A threaded pin 111 extends through a correspondingly threaded hole provided in door 8; the pin carries at its outside end a knob 112; pin 111 is kept in contact with plate 110 by spring 113.

By inside pushing knob 112 the mirror 9 is turned about pivot 108, that is about a vertical axis, by turning the knob the mirror will be rotated about a horizontal axis; besides the mirror can be completely moved out of the path of the light rays by opening door 8, this door being connected with bracket 106 and therefore entraining the mirror; normally the door will be closed and the film image will be projected on screen 11.

The rear mirror 102 is supported on base plate 2 at an angle of about 30 degrees relative to the horizontal center line of the system and at an angle of about 5 degrees relative to the vertical direction. Screen 11 is normally tilted at 10 degrees relative to the vertical direction in the same sense as mirror 102.

The entire mechanism, described above, including the film holding, transporting and projecting unit and the mirror system is mounted on base plate 2 and the casing 1 is in no way functionally connected with the machine; it forms a cover only; its dimensions or its shape have no bearing whatsoever on the mechanical or optical functioning of the invention.

In this manner the machine comprises two main parts viz. the film holding, transporting and projecting unit and the film image directing unit, both located in adjacent relationship on a base, the film holding, transporting and projecting unit being composed of the outer stationary frame including the light source and the inner rotatable frame including the lens aggregate, the light condenser, the film reels and the mechanism to operate and to control the same; a great stability of construction and an easy assembling comfort is hereby obtained.

The operation of the instrument is as follows:

Upon rotation of handwheel 23 in the clockwise direction pin 60 is brought in contact with contact blade 62 and by continued rotation the gap $a$, see Fig. 8, between contact blades 62, 63 and the circuit is closed; the solenoid coil 77 is energized and core 78 displaced in the direction of the arrow, Fig. 8, rotates plate 54 and opens the film gate.

When continuing the rotation of the handwheel, pin 61 contacts pin 68 whereby disc 87 is rotationally entrained and shaft 24 commences to be rotated. The rotation of shaft 24 sets the above described gear and shaft train in operation and as a result hereof the film is transported through the gate.

If handwheel 23 is turned in the opposite or counterclockwise direction, the same procedure takes place insofar as pin 61 closes the contact blades 62, 63 and pin 60 is pushed against pin 67.

It results from the above that the film gate is immediately opened when the handle 118 of handwheel 23 is operated; on the other hand it is closed automatically when the handweel rotation is stopped because then the pressure which closes the gap $a$ is eliminated; the contact blades 62, 63 are opened, the circuit is interrupted and the spring 56 closes the film gate 53, 54 the film being thereby straightened to secure exact projection.

While the invention has been described in connection with the visual examination of films and particularly reading matter recorded on 16 millimeter microfilms or parts thereof, it is apparent that the machine may also be used for other purposes, such as the projection of all kinds of opaque negatives, positives or colored pictures which makes the machine particularly adaptable to the projection of colored plates on a wall or a screen; in addition thereto it may well be used for enlargements on paper.

Having now particularly described my invention, what I desire to secure by Letters Patent and what I claim is:

1. A microfilm reader comprising a closed casing composed of a base, of sidewalls and of a top, a screen in a sidewall, a light source, a film holding, film transporting and projecting unit supported on said base to produce an enlarged film image, two mirrors positioned on said base in adjacent relationship with said film holding, transporting and projecting unit, the first mirror being so located in the path of the light rays as to reflect said film image onto the second mirror, said second mirror being so located as to direct said film image onto said screen, a vertical pivot supported on said base, said first mirror being rotatably mounted by means of said pivot, and means operable from outside said casing to turn said mirror about a vertical axis and to accordingly displace said film image on said screen in a horizontal direction.

2. A microfilm reader comprising a closed casing composed of a base, of sidewalls and of a top, a screen in a sidewall, a light source on said base, a film holding, film transporting and projecting unit supported on said base to produce an enlarged film image, two mirrors positioned on said base in adjacent relationship with said film holding, transporting and projecting unit, a first mirror being so located in the path of the light rays as to direct said film image onto said second mirror, a second mirror being so located as to direct said film image onto said screen, a vertical pivot supported on said base, a bracket rotatably mounted on said vertical pivot, a horizontal pivot rotatably supported in said bracket, said first mirror being secured to said horizontal pivot, and means operative from the outside of said casing to turn said mirror about said pivots in order to displace the film image on said screen in a horizontal and in a vertical direction.

3. A microfilm reader comprising a casing having a base and sidewalls, a screen in a sidewall, an outer U-shaped frame solidly mounted on said base, an electrical light source on said frame, an inner U-shaped frame rotatably mounted in said outer fixed frame, a film holding, film transporting and projecting unit to produce an enlarged film image located on said rotatable inner frame in the center of the rays emitted from said light source said unit including two film reels, a light condensing device, a film gate composed of a stationary and a movable transparent plate and a projecting lens aggregate, means to rotate said film reels to wind and unwind the film and to simultaneously transport the same through said gate, a handwheel at the outside of said casing to operate said reels, a solenoid to separate said movable gate plate from said fixed plate and to thereby open said film gate, means operative upon rotation of said handwheel to first energize said solenoid and to open said gate, means successively operative upon further rotation of said handwheel to effect the coaction of the same with said reel rotating and film transporting means, means to direct said enlarged film image onto said screen and means to deenergize said solenoid and means to close said film gate upon discontinuation of the handwheel rotation.

4. A microfilm reader comprising a casing having a base and sidewalls, a screen in a sidewall, an outer U-shaped frame solidly mounted on said base, an electrical light source on said frame, an inner U-shaped frame rotatably mounted in said outer fixed frame, a film holding, film transporting and projecting unit to produce an enlarged film image located on said rotatable inner frame in the center of the rays emitted from said light source said unit including two film reels, a light condensing device, a film gate composed of a stationary and a movable transparent plate and a projecting lens aggregate, means to rotate said film reels to wind and unwind the film and to simultaneously transport the same through said gate, a handwheel at the outside of said casing to operate said film winding and transporting reels, said hand wheel consisting of an outer and an inner disc enclosing a cavity therebetween, said discs adapted to be rotated first independently and then cooperatively, two resilient contact blades on said inner disc connected with the current circuit of the light source, two pins on said disc, one of said pins located for displacement upon rotation of said hand wheel to close said resilient contact blades, a solenoid arrangement composed of a coil and a displaceable core, said coil being connected with said blade circuit, said core being located in operational contact with said movable film gate to be displaced upon the closure of said blade contacts and to thereby open said movable film gate, pins in said inner cavity operative upon further means to direct said enlarged film image onto said screen, said resilient blade automatically reactive upon the discontinuation of the handwheel rotation and the release of the pressure exerted upon the same to interrupt the current supply and to deenergize said solenoid and resilient means to move said movable gate plate in its original position and to close the gate.

5. A microfilm reader comprising a casing having a base and sidewalls, a screen in a sidewall, an outer U-shaped frame fixedly mounted upon said base, a light source on said frame, bushings rotatably located in the upper end portions of said frame and inwardly projecting therefrom, an inner U-shaped frame connected to and carried by said bushings, one bushing having an enlarged inner cavity, a film holding, film transporting and projecting unit to produce an enlarged film image located on said inner rotatable frame in the center of the rays emitted from said light source, said unit including two film reels, a light condensing device, a film gate and a projector lens aggregate, said lens aggregate being axially slidably carried in said bushing, means to direct said enlarged film image onto said screen and means to rotate said inner frame and said film reels.

6. In combination with a microfilm reader according to claim 5, a barrel in the hollow bushing accommodating the projector lens aggregate, means to axially displace said barrel in said bushing for focussing the lens aggregate, said means including a two-arm lever and a rotatable shaft, one lever arm being connected to said barrel and the other lever arm to said shaft and a rotatable knob at the outside of the casing to operate the said barrel displacing means.

7. A microfilm reader comprising a casing having a base and sidewalls, a screen in a sidewall, an outer U-shaped frame fixedly mounted upon said base, a light source on said frame, an inner U-shaped frame rotatably mounted in said outer stationary frame, a film holding, film transporting and projecting unit to produce an enlarged film image located on said rotatable frame, said frame being shaped to form to opposite lateral extensions, vertical hubs located on said lateral extensions, shafts extending through said hubs and projecting therefrom at both ends, means located underneath said frame to rotate said shafts, film reels vertically slidably carried on said shafts, springs interposed between the upper end of said hubs and said film reels, slots in the end portion of said shafts, pins extending through said slots, reel securing levers having a shorter and a longer arm rotatably mounted on said pin in such a manner as to be moved through said slots and to thereby secure said reels in their operating position upon rotation of said levers into the horizontal position and to permit the removal of said reels from said shafts upon rotation in the vertical position, means on said base to direct said enlarged film image onto said screen, means to rotate said inner frame and means provided at the outside of said casing to control said reel shafts and said frame rotating means.

8. A microfilm reader comprising a closed casing composed of a base, of sidewalls and of a top, a screen in a sidewall, an outer U-shaped frame fixedly mounted on said base, a light source on said base, an inner U-shaped frame rotatably mounted in said outer stationary frame to form a turntable, a film holding, transporting and projecting unit to produce an enlarged film image located on said turntable in the path of the rays emitted from said light source, two film reels rotatably supported on said turn table, bearings at the underside of said turntable, a gear train to rotate said film reels supported in said bearings, mirrors positioned on said base in adjacent relationship with said film holding, transporting and projecting unit to direct said enlarged film image onto said screen, and means to rotate one of said mirrors about a vertical and about a horizontal axis in order to displace the film image on the screen in a horizontal and in a vertical direction, means to rotate said unit and a handwheel at the outside of said caisng to control the gear train rotating said film reels.

9. In a microfilm reader according to claim 8, an axially displaceable gear operatively inserted into the gear train and an axially displaceable handwheel to displace said gear and to thereby vary the speed of the film transportation.

10. A microfilm reader comprising a casing having a base and sidewalls, a screen in a sidewall, an outer U-shaped frame fixedly mounted upon said base, a light source on said frame, an inner U-shaped frame tiltably mounted in said outer fixed frame, a film holding, transporting and projecting unit to produce an enlarged film image, said unit located on said tiltable frame in such a manner that the tilting axis of the frame extends through the optical axis of the projection system, said unit including two film reels, a light condensing device, a film gate and a projector lens, means to project said film image onto said screen, means to operate said film holding, transporting and projecting unit and means provided at the outside of said casing to control said unit operating means.

11. A microfilm reader comprising a closed casing composed of a base, side walls and a top, a screen in a side wall, an outer U-shaped frame mounted on said base, an inner U-shaped frame rotatably mounted in said outer frame, the web portion of said inner frame forming a turn table and the flanges of said two frames extending in parallel adjacent relationship, a film holding, film transporting and projecting unit including two film reels, a light source, a condenser, a film gate and a projector lens on said turntable to produce an enlarged film image, two mirrors in said casing next to said film holding and projecting unit to project said enlarged film image onto said screen, means attached to the lower side of said turntable to operate said film reels and means including a handwheel and a knob at the outside of said casing to rotate said inner frame and to impart rotation to said film reel operating means.

12. A microfilm reader comprising a closed casing composed of a base, side walls and a top, a screen in a side wall, an outer U-shaped frame mounted on said base, an inner U-shaped frame rotatably mounted in said outer frame, the web portion of said inner frame forming a turn table and the flanges of said two frames extending in parallel adjacent relationship, a film holding, film transporting and projecting unit including two film reels, a light source, a condenser, a film gate and a projector lens on said turntable to produce an enlarged film image, a post for said light source mounted on the web of said outer frame in excentric relationship to the center line of the film projection, an arm attached to said post to support said light source in the center line of the film projection and a recess in said turn table for said post, two mirrors in said casing next to said film holding and projecting unit to project said enlarged film image onto said screen, means attached to the lower side of said turntable to operate said film reels and means including a handwheel and a knob at the outside of said casing to rotate said inner frame and to impart rotation to said film reel operating means.

13. In a microfilm reader according to claim 10 a handle provided with a counterweight attached to said inner frame.

14. A microfilm reader comprising a casing having a base and sidewalls, a screen in a sidewall, an outer U-shaped frame mounted upon said base, a light source on said frame, bushings rotatably located in the upper end portions of said frame and inwardly projecting therefrom, an inner U-shaped frame connected to and carried by said bushings, one bushing having an enlarged inner cavity, a film holding, film transporting and projecting unit to produce an enlarged film image located on said inner rotatable frame in the center of the rays emitted from said light source, said unit including two film reels, a light condensing device, a film gate and a projector lens aggregate, said lens aggregate being axially slidably carried in said bushing, means to direct said enlarged film image onto said screen and means to rotate said inner frame and said film reels, a barrel in the hollow bushing accommodating the projector lens aggregate, means to axially displace said barrel in said bushing for focussing the lens aggregate, said means including a two-arm lever and a rotatable shaft, one lever arm being connected to said barrel and the other lever arm to said shaft and a rotatable knob at the outside of the casing to operate the said barrel displacing means.

15. A microfilm reader comprising a casing composed of a base, side walls and a top, a partition to divide said casing into two compartments, a film holding, transporting and projecting unit rotatably mounted in the one compartment to produce an enlarged film image, said top being provided with an opening to give access to the said compartment, a cover for said compartment hingedly attached to said top and consisting of a part thereof and of an upper portion of said side walls, a screen in a side wall, at least one mirror in said second compartment to direct the enlarged film image onto said screen and means for operating the said mirror from the outside of said casing.

16. A microfilm reader comprising a casing having a base and sidewalls, a screen in a side wall, an outer U-shaped frame fixedly mounted upon said base, a light source, bushings rotatably located in the upper end portion of said frame and inwardly projecting therefrom, an inner U-shaped frame connected to and carried by said bushings, a film holding, film transporting and projecting unit to produce an enlarged film image, said unit being located on said inner rotatable frame in the center of the rays emitted from said light source and including two film reels, a light condensing device, a film gate and a projector lens aggregate, means to direct said enlarged film image onto said screen and means to rotate said inner frame and said film reels.

NATHAN SALLY STERN.

REFERENCES CITED

The following references are of record in the file of this patent:

UNITED STATES PATENTS

| Number | Name | Date |
|---|---|---|
| 1,428,347 | Van Altena | Sept. 5, 1922 |
| 1,447,403 | Atherton | Mar. 6, 1923 |
| 1,889,575 | Sebille | Nov. 29, 1932 |
| 2,022,903 | Thomas | Dec. 3, 1935 |
| 2,113,578 | Draeger | Apr. 12, 1938 |
| 2,125,582 | Pratt et al. | Aug. 2, 1938 |
| 2,195,425 | Roger | Apr. 2, 1940 |
| 2,279,463 | Hopkins | Apr. 14, 1942 |
| 2,293,207 | Haskins et al. | Aug. 18, 1942 |
| 2,332,810 | Place | Oct. 26, 1943 |